United States Patent
Hibi (10) Patent No.: US 8,067,049 B2
(45) Date of Patent: Nov. 29, 2011

(54) METHOD OF STORING ROASTED COFFEE BEANS

(75) Inventor: Takayoshi Hibi, Aichi (JP)

(73) Assignee: Nagoyaseiraku Co., Ltd., Nagoya-Shi, Aichi (JP)

( * ) Notice: Subject to any disclaimer, the term of this patent is extended or adjusted under 35 U.S.C. 154(b) by 297 days.

(21) Appl. No.: 12/050,263

(22) Filed: Mar. 18, 2008

(65) Prior Publication Data

US 2008/0233265 A1    Sep. 25, 2008

(30) Foreign Application Priority Data

Mar. 20, 2007 (JP) ................................ 2007-072850

(51) Int. Cl.
*A23F 5/10* (2006.01)

(52) U.S. Cl. ........ 426/316; 426/393; 426/419; 426/432; 426/466; 426/524; 426/595; 426/629

(58) Field of Classification Search .................. 426/466, 426/444, 524, 629, 418–419, 595, 432, 393, 426/316

See application file for complete search history.

(56) References Cited

U.S. PATENT DOCUMENTS

| | | | | |
|---|---|---|---|---|
| 1,636,300 A | * | 7/1927 | Gewalt | 426/444 |
| 1,924,059 A | * | 8/1933 | Hoskins | 426/393 |
| 1,992,556 A | * | 2/1935 | Tone | 426/397 |
| 2,027,429 A | * | 1/1936 | Hansen | 426/404 |
| 2,045,319 A | * | 6/1936 | Watrous | 34/428 |
| 2,046,158 A | * | 6/1936 | Gore et al. | 426/392 |
| 2,235,315 A | * | 3/1941 | Donnelly | 426/454 |
| 2,855,313 A | * | 10/1958 | Bach | 426/442 |
| 3,039,882 A | * | 6/1962 | Clinton et al. | 426/397 |
| 3,547,653 A | * | 12/1970 | Hixson et al. | 426/455 |
| 3,725,076 A | * | 4/1973 | Stefanucci et al. | 426/393 |
| 4,069,349 A | * | 1/1978 | Shaw | 426/395 |
| 5,368,875 A | | 11/1994 | Hibi et al. | |
| 5,637,343 A | * | 6/1997 | Ryan, Jr. | 426/594 |
| 5,993,877 A | | 11/1999 | Ohtake | |
| 6,514,552 B1 | * | 2/2003 | Sivetz | 426/393 |
| 6,814,991 B2 | | 11/2004 | Hiyoshi | |
| 6,861,086 B2 | * | 3/2005 | Buckingham et al. | 426/594 |
| 2002/0054938 A1 | * | 5/2002 | Hiyoshi | 426/112 |

FOREIGN PATENT DOCUMENTS

| | | |
|---|---|---|
| CN | 1106626 A | 8/1995 |
| GB | 2 022 394 A | 6/1979 |
| JP | 55026887 A | 2/1980 |
| JP | 2117346 | 5/1990 |
| JP | 3067545 | 3/1991 |
| JP | 4210554 A * | 7/1992 |
| JP | 4210554 A | 7/1992 |
| JP | 5000048 A | 1/1993 |

(Continued)

OTHER PUBLICATIONS

Notice of Reason(s) for Rejection issued on Aug. 24, 2010 in the corresponding Japanese Patent Application No. 2008-069872 and an English translation of the relevant portion. Notice of Reason(s) for Rejection issued on Aug. 24, 2010 in the corresponding Japanese Patent Application No. 2008-069873 and an English translation of the relevant portion.

(Continued)

*Primary Examiner* — Drew E Becker (74) *Attorney, Agent, or Firm* — Davis & Bujold, P.L.L.C.

(57) ABSTRACT

Roasted coffee beans are cooled and stored to a temperature of 0° C. or below before elapse of forty eight hours of holding time at room temperature or below after roasting.

8 Claims, 4 Drawing Sheets

FOREIGN PATENT DOCUMENTS

| | | |
|---|---|---|
| JP | 5076284 A | 3/1993 |
| JP | 5294368 A | 11/1993 |
| JP | 8000175 A | 1/1996 |
| JP | 8322467 | 12/1996 |
| JP | 11-225673 | 8/1999 |
| JP | 2001112415 A | 4/2001 |
| JP | 2001112416 | 4/2001 |
| JP | 2002096877 A | 4/2002 |
| JP | 2003291916 | 10/2003 |
| JP | 2004041009 A | 2/2004 |
| PH | 1-1994-48646 | 4/2002 |
| PH | 1 1994 48646 | 4/2002 |
| TW | 181857 | 4/1992 |

OTHER PUBLICATIONS

Notification of the First Office Action issued on Oct. 12, 2010 in the corresponding Chinese Patent Application No. 200810084010.2, and an English translation of the relevant portion.

Notice of Reason(s) for Rejection dated on Apr. 26, 2011 in Japanese Patent Application No. 2008-069872.

English Translation of Notice of Reason(s) for Rejection dated on Apr. 26, 2011 in Japanese Patent Application No. 2008-069872.

Office Action dated Jul. 20, 2011 in Taiwan Patent Application No. 97109447 with English translation of the relevant portion.

* cited by examiner

METHOD OF STORING ROASTED COFFEE BEANS

CROSS-REFERENCE TO RELATED APPLICATIONS

This application claims the benefit of Japanese Patent Application No. 2007-072850 filed Mar. 20, 2007 in the Japan Patent Office, the disclosures of which are incorporated herein by reference.

TECHNICAL FIELD

This invention relates to manufacturing of coffee beverages. More particularly, this invention is concerned with a method of storing roasted coffee beans.

BACKGROUND ART

Roasted coffee beans are known to change flavor as time elapses after roasting. Liquid extract thereof which serves as a drink is also known to largely change flavor over time. Generally, liquid coffee extract quickly changes flavor—"drink within thirty minutes after extraction"—as is said. It is difficult to keep the liquid extract without causing change in flavor.

However, considering the trouble and the costs of extraction, many of the large-scale casual restaurants and fast food restaurants serves coffee brewed in advance and kept in thermal pots until served. Therefore, depending on the frequency of customer orders, the coffee which has changed flavor due to long time holding after extraction at high temperature has to be served to customers. Or, the coffee has to be disposed of when certain time elapses after extraction. As above, long time storage of coffee without degradation of flavor is a critical issue for the food service industry which serves non-instant coffee. Nevertheless, no effective measures have been taken.

Unexamined Japanese Patent Publication Nos. 8-322467, 11-225673, and 2001-112416 disclose techniques for inhibiting change in flavor of non-instant coffee. In these publications, pH adjusters, sugars, antioxidant and/or synthetic preservatives are added to liquid coffee extract. The publications are mainly concerned with coffee beverages in containers such as canned coffee.

SUMMARY OF THE INVENTION

According to the conventional techniques disclosed in the above publications, the liquid coffee extract has to contain certain additives. This does not suit the tastes of consumers fond of drinking non-instant coffee. Furthermore, the manufacturing costs are increased due to complicated processing steps. Thus, the above techniques are hardly practiced in the food service industry.

For these reasons, in the food service industry, there are needs of non-instant coffee which changes little in flavor after extraction even without additives and which can be stored for a long period of time. Such needs are not limited to the food service industry.

Roasted beans for non-instant coffee in the market are usually treated with a process of degassing carbon dioxide gas called "aging". This process is performed to prevent a container containing roasted beans from swelling and bursting by carbon dioxide gas emitted from the roasted beans packed in the container. The aging is generally conducted at room temperature or above. Normally, degassing of carbon dioxide gas is continued for three to five days.

The inventor of the present application conducted sensory analysis of liquid coffee extract obtained from non-aged roasted beans immediately after roasting and aged roasted beans. The liquid extract from the aged roasted beans changed flavor after thirty minutes from extraction, while the liquid extract from the non-aged roasted beans did not change flavor even after two hours from extraction.

Various researches were made by the inventor on carbon dioxide gas volume in roasted beans and change in flavor. As a result, it was found that change in flavor can be inhibited by suppressing decrease of carbon dioxide gas in the roasted beans which is normally removed at the time of packing.

One aspect of the present invention provides a method of storing roasted coffee beans including a step of cooling and storing the roasted coffee beans to a temperature of 0° C. or below before elapse of forty eight hours of holding time at room temperature or below after roasting. Cooling and storing the roasted beans under such conditions can suppress emission of carbon dioxide gas from the beans in storage. As a result, liquid extract of the roasted coffee beans has little change in flavor after extraction.

BRIEF DESCRIPTION OF THE DRAWINGS

The invention will now be described below, by way of example, with reference to the accompanying drawings, in which.

DETAILED DESCRIPTION OF THE PREFERRED EMBODIMENT

Embodiments of the present invention will now be described in detail.

There is no specific limitation on type of coffee beans used as raw material. Any brand of beans or blended beans can be used. Coffee beans are roasted by common procedure. For instance, the coffee beans may be roasted for about twenty minutes at a hot blast temperature of 400° C. to 500° C. by a hot blast drum roaster.

The temperature of the roasted coffee beans immediately after roasting is about 200° C. The temperature of the roasted beans is lowered to room temperature (10° C. to 28° C.) by forced cooling. One example of a manner of cooling the roasted beans to room temperature is to use a cooling fan. However, the roasted beans may be cooled in any other manner. In the case of shipping the roasted beans, the beans should be cooled to 0° C. or below within forty eight hours, preferably within twenty four hours, after cooled to room temperature. The cooling temperature may be any temperature equal to or lower than 0° C. A cooling temperature of −30° C. to 0° C. is preferred. Also, it is preferable to store the beans at a temperature of −30° C. to 0° C. even after the cooling. In case that the holding time at room temperature after roasting exceeds forty eight hours, or the cooling temperature exceeds 0° C., there is substantial change in flavor of the liquid coffee extract. Also, if the cooling temperature is −30° C. to 0° C., no special equipment is required since cooling can be conducted by an ordinary refrigerator.

The roasted coffee beans can be ground in a conventional manner. The grinding may be performed in room temperature atmosphere. Frozen roasted beans can be directly ground. This is because the shorter the period of time is to keep the beans at room temperature, the better. Also, even if ground as frozen, the roasted beans go back to room temperature by heat caused by friction at the time of grinding. Thus, temperature decrease in hot water temperature is inhibited in subsequent extraction. There is no adverse effect in flavor.

The amount of dissipation of carbon dioxide gas upon grinding of the roasted coffee beans is substantially constant. If carbon dioxide gas volume in the roasted beans is little, carbon dioxide gas volume in the ground beans is also little, sometimes closer to zero. Liquid coffee extract of such beans changes flavor quickly. In some circumstances, the flavor largely changes in thirty minutes. So the liquid extract is not suitable for drinking.

There is no specific restriction in manners to obtain liquid coffee extract from ground coffee beans. Any known brewing procedures may be used such as dripping, dipping, siphon and espresso. There is also no specific limitation in water temperature (hot, warm, cool, etc.) at the time of brewing.

Detailed description of the present invention will now be given by way of embodiments. However, the present invention is not limited by the below described embodiments and can be practiced in various manners without departing from the scope of the present invention.

Embodiment 1

Holding Time at Room Temperature after Roasting and Carbon Dioxide Gas Volume (I)

Three kilograms of blend of Brazil Santos No. 2 (25%), Columbia Supremo (35%), Ethiopia Djimmah (25%), and Indonesia WIB (15%) was roasted by a roaster manufactured by Fuji Kouki Co., Ltd. The roasting continued until the L-value (lightness), representing the degree of roast of the beans, measured 22 with a color-difference meter (ND1001DP) manufactured by Nippon Denshoku Industries Co., Ltd. Then, the roasted beans were divided into eleven batches, with each batch kept and stored in the following conditions.

The room temperature here is 28° C.

The First Batch

Embodiment 1-1

After cooled to room temperature, the batch was sealed in an aluminum pouch made of aluminum foil, polyethylene and polyethylene terephthalate (hereinafter, referred to just as aluminum pouch), and immediately stored at 0° C. for five days.

The Second Batch

Embodiment 1-2

After cooled to room temperature, the batch was kept at room temperature for twenty four hours and immediately sealed in an aluminum pouch to be stored at 0° C. for five days.

The Third Batch

Embodiment 1-3

After cooled to room temperature, the batch was kept at room temperature for thirty hours and immediately sealed in an aluminum pouch to be stored at 0° C. for five days.

The Fourth Batch

Embodiment 1-4

After cooled to room temperature, the batch was kept at room temperature for forty hours and immediately sealed in an aluminum pouch to be stored at 0° C. for five days.

The Fifth Batch

Embodiment 1-5

After cooled to room temperature, the batch was kept at room temperature for forty four hours and immediately sealed in an aluminum pouch to be stored at 0° C. for five days.

The Sixth Batch

Embodiment 1-6

After cooled to room temperature, the batch was kept at room temperature for forty eight hours and immediately sealed in an aluminum pouch to be stored at 0° C. for five days.

The Seventh Batch

Reference Example 1-1

After cooled to room temperature, the batch was kept at room temperature for fifty two hours and immediately sealed in an aluminum pouch to be stored at 0° C. for five days.

The Eighth Batch

Reference Example 1-2

After cooled to room temperature, the batch was kept at room temperature for fifty six hours and immediately sealed in an aluminum pouch to be stored at 0° C. for five days.

The Ninth Batch

Reference Example 1-3

After cooled to room temperature, the batch was kept at room temperature for sixty hours and immediately sealed in an aluminum pouch to be stored at 0° C. for five days.

The Tenth Batch

Reference Example 1-4

After cooled to room temperature, the batch was kept at room temperature for seventy two hours and immediately sealed in an aluminum pouch to be stored at 0° C. for five days.

The Eleventh Batch

Reference Example 1-5

After cooled to room temperature, the batch was kept at room temperature for ninety six hours and immediately sealed in an aluminum pouch to be stored at 0° C. for five days.

Each batch of the roasted beans was ground by a BONMAC coffee cutter (BM-650) manufactured by Lucky i Cremus Co., Ltd. immediately after storage under the above conditions. After extraction of the beans, sensory analysis was conducted.

That is, 10 g of the respective ground beans of Embodiments 1-1 to 1-6 and Reference Examples 1-1 to 1-5 was extracted with 140 ml of hot water through Kalita paper dripper. The extracts were kept in stainless thermos flasks. Assuming that immediate aftermath of extraction corresponds to zero hours, sensory analysis was performed by fifteen panelists after one hour, two hours, and three hours from extraction.

Upon the analysis, liquid coffee extract after zero hours from extraction, which was obtained by grinding and extracting the above roasted beans in the same manner as above immediately after cooled to room temperature (i.e., without conforming to the above conditions), is set as a standard. Each panelist graded the beans in five grades, that is, "+2": no different, "+1": slightly different, "0": different, "−1": largely different, and "−2": extremely different. The grades by 15 panelists were summed up.

[Measurement of Carbon Dioxide Gas Volume]

Carbon dioxide gas volume in the roasted beans was measured as follows. The roasted beans were boiled with nitrogen gas injection to collect carbon dioxide gas. Collected carbon dioxide gas is introduced into a saturated calcium hydroxide solution for production of calcium carbonate. The produced calcium carbonate was collected and weighed to calculate carbon dioxide gas volume.

That is, 10 g of the roasted beans was put into a conical flask of 100 ml. 60 ml of distilled water was added. Nitrogen gas was adjusted by a pressure reducing valve (YR-70 manufactured by Yamato Sangyo Co., Ltd). The beans and water in the flask were boiled for forty five minutes with injection of the nitrogen gas at a flow rate of about 5 ml/minute. Produced carbon dioxide gas was passed through a cooling pipe into 250 ml of saturated calcium hydroxide solution to produce calcium carbonate. Upon introduction of carbon dioxide gas into the saturated calcium hydroxide solution, the conical flask was sealed, for example by a rubber plug, so that the injected nitrogen gas does not leak. The produced calcium carbonate was collected by suction through a crucible glass filter (1G3) containing 1.2 g of celite (manufactured by Wako Pure Chemical Industries, Ltd.). The collected calcium carbonate was dried and weighed.

Carbon dioxide gas volume in the roasted beans was calculated according to the following formula.

Carbon dioxide gas volume (ml/g) in roasted beans=
$(b \div 100) \times 22414(ml) \div a (g)$ where
a: amount of roasted beans,
b: weight of calcium carbonate,
100: molecular weight of calcium carbonate,
22414 (ml): ideal gas volume per mol at STP (Standard Temperature and Pressure).

Results obtained are shown in TABLE 1.

TABLE 1

| Holding Time at Room Temperature | Carbon Dioxide Gas Volume (ml/g) in Roasted Beans | Sensory analysis Elapsed time after extraction | | | |
|---|---|---|---|---|---|
| | | 0 hours | 1 hour | 2 hours | 3 hours |
| Embodiment 1-1: 0 hours | 4.65 | +26 | +19 | +14 | −8 |
| Embodiment 1-2: 24 hours | 4.45 | +23 | +22 | +12 | −6 |
| Embodiment 1-3: 30 hours | 4.46 | +25 | +20 | +14 | −2 |
| Embodiment 1-4: 40 hours | 4.33 | +23 | +20 | +13 | −8 |
| Embodiment 1-5: 44 hours | 4.32 | +26 | +19 | +14 | −7 |
| Embodiment 1-6: 48 hours | 4.31 | +25 | +17 | +13 | −6 |
| Reference Ex. 1-1: 52 hours | 4.06 | +25 | +15 | −3 | −12 |
| Reference Ex. 1-2: 56 hours | 3.90 | +26 | +16 | −2 | −15 |
| Reference Ex. 1-3: 60 hours | 3.85 | +25 | +12 | −5 | −14 |
| Reference Ex. 1-4: 72 hours | 3.84 | +24 | +14 | −10 | −14 |
| Reference Ex. 1-5: 96 hours | 3.46 | +25 | +13 | −7 | −15 |

Figure 1:
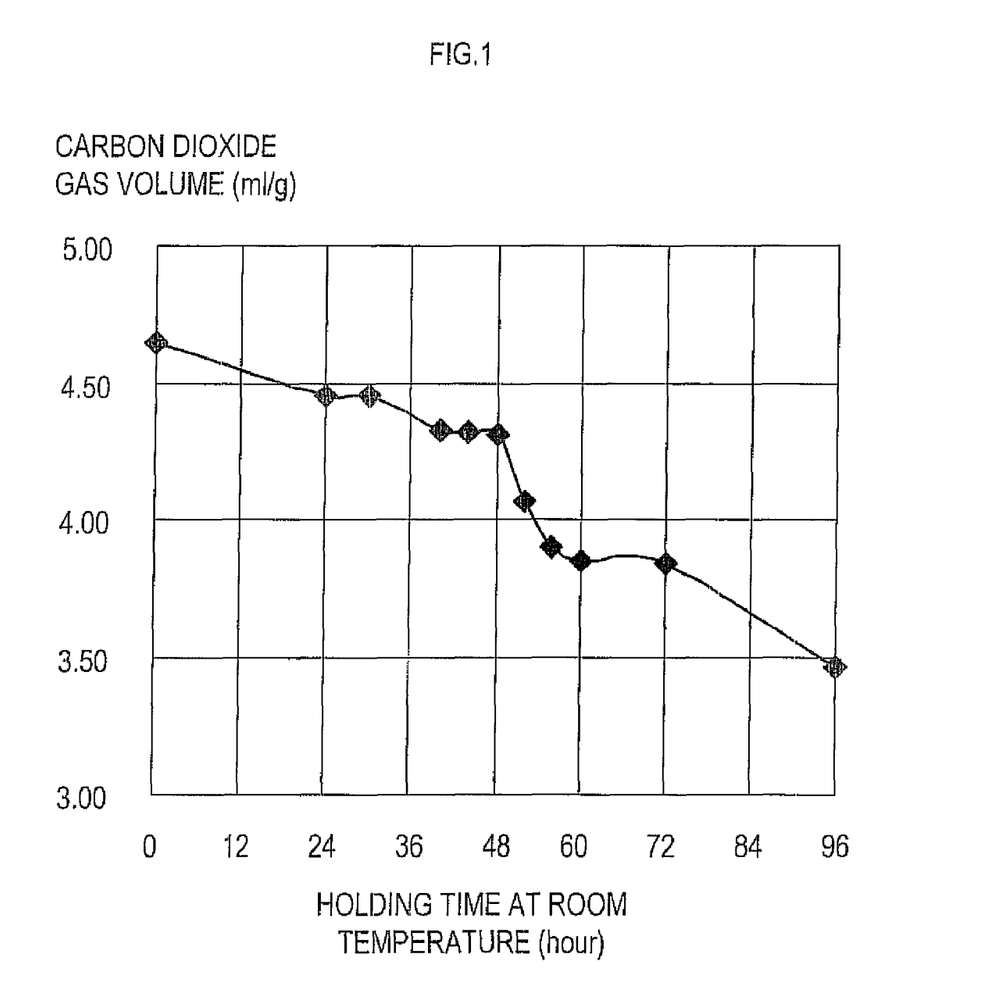
FIG. 1 is a graph showing a relation between holding time and carbon dioxide gas volume when roasted coffee beans are kept at room temperature and stored at 0° C.

FIG. 1 is a graph showing a relation between the holding time and the carbon dioxide gas volume shown in TABLE 1. It was understood from FIG. 1 that there is substantial difference in carbon dioxide gas volume before and after elapse of forty eight hours of holding time. As seen in TABLE 1, carbon dioxide gas volume in the beans was not largely reduced within forty eight hours of holding time at room temperature after roasting. In this case, change in flavor of the liquid extract was avoided. No substantial difference in flavor was sensed in two hours after extraction. In the case of the beans kept at room temperature for fifty two hours or more (Reference Example 1-1), carbon dioxide gas volume was decreased to 87% of that of the beans immediately stored after roasting (Embodiment 1-1). Although the decrease in carbon dioxide gas volume was not so large, there was substantial change in flavor in two hours after extraction in the sensory analysis. As the holding time became longer like fifty six hours (Reference Example 1-2), sixty hours (Reference Example 1-3), seventy two hours (Reference Example 1-4) and ninety six hours (Reference Example 1-5), carbon dioxide gas volume in roasted beans became low and change in flavor of the liquid extract became large.

Embodiment 2

Holding Time at Room Temperature after Roasting and Carbon Dioxide Gas Volume (II)

In Embodiment 1, the holding temperature after roasting was set to 0° C. In the present embodiment, an example is shown when the holding temperature was set to −37° C.

Three kilograms of blend of Brazil Santos No. 2 (25%), Columbia Supremo (35%), Ethiopia Djimmah (25%), and Indonesia WIB (15%) was roasted by a roaster manufactured by Fuji Kouki Co., Ltd. The roasting continued until the L-value (lightness), representing the degree of roast of the beans, measured 22 with a color-difference meter (ND1001DP) manufactured by Nippon Denshoku Industries Co., Ltd. Then, the roasted beans were divided into eleven batches, with each batch kept and stored in the following conditions.

The room temperature here is 28° C.

The First Batch

Embodiment 2-1

After cooled to room temperature, the batch was sealed in an aluminum pouch and immediately stored at −37° C. for five days.

The Second Batch

Embodiment 2-2

After cooled to room temperature, the batch was kept at room temperature for twenty four hours and immediately sealed in an aluminum pouch to be stored at −37° C. for five days.

The Third Batch

Embodiment 2-3

After cooled to room temperature, the batch was kept at room temperature for thirty hours and immediately sealed in an aluminum pouch to be stored at −37° C. for five days.

The Fourth Batch

Embodiment 2-4

After cooled to room temperature, the batch was kept at room temperature for forty hours and immediately sealed in an aluminum pouch to be stored at −37° C. for five days.

The Fifth Batch

Embodiment 2-5

After cooled to room temperature, the batch was kept at room temperature for forty four hours and immediately sealed in an aluminum pouch to be stored at −37° C. for five days.

The Sixth Batch

Embodiment 2-6

After cooled to room temperature, the batch was kept at room temperature for forty eight hours and immediately sealed in an aluminum pouch to be stored at −37° C. for five days.

The Seventh Batch

Reference Example 2-1

After cooled to room temperature, the batch was kept at room temperature for fifty two hours and immediately sealed in an aluminum pouch to be stored at −37° C. for five days.

The Eighth Batch

Reference Example 2-2

After cooled to room temperature, the batch was kept at room temperature for fifty six hours and immediately sealed in an aluminum pouch to be stored at −37° C. for five days.

The Ninth Batch

Reference Example 2-3

After cooled to room temperature, the batch was kept at room temperature for sixty hours and immediately sealed in an aluminum pouch to be stored at −37° C. for five days.

The Tenth Batch

Reference Example 2-4

After cooled to room temperature, the batch was kept at room temperature for seventy two hours and immediately sealed in an aluminum pouch to be stored at −37° C. for five days.

The Eleventh Batch

Reference Example 2-5

After cooled to room temperature, the batch was kept at room temperature for ninety six hours and then sealed in an aluminum pouch to be stored at −37° C. for five days.

Results obtained are shown in TABLE 2.

TABLE 2

| Holding Time at Room Temperature | Carbon Dioxide Gas Volume (ml/g) in Roasted Beans | Sensory analysis Elapsed time after extraction | | | | |
|---|---|---|---|---|---|---|
| | | 0 hours | 0.5 hours | 1 hour | 2 hours | 3 hours |
| Embodiment 2-1: 0 hours | 4.85 | +24 | +19 | +21 | +12 | −8 |
| Embodiment 2-2: 24 hours | 4.58 | +23 | +20 | +20 | +16 | −2 |
| Embodiment 2-3: 30 hours | 4.52 | +25 | +21 | +20 | +14 | −6 |
| Embodiment 2-4: 40 hours | 4.50 | +23 | +20 | +21 | +13 | −5 |
| Embodiment 2-5: 44 hours | 4.40 | +26 | +19 | +19 | +14 | −7 |

TABLE 2-continued

| Holding Time at Room Temperature | Carbon Dioxide Gas Volume (ml/g) in Roasted Beans | Sensory analysis Elapsed time after extraction | | | | |
|---|---|---|---|---|---|---|
| | | 0 hours | 0.5 hours | 1 hour | 2 hours | 3 hours |
| Embodiment 2-6: 48 hours | 4.31 | +28 | +20 | +18 | +12 | −6 |
| Reference Ex. 2-1: 52 hours | 3.90 | +25 | +18 | +15 | +7 | −12 |
| Reference Ex. 2-2: 56 hours | 3.95 | +26 | +18 | +16 | +8 | −15 |
| Reference Ex. 2-3: 60 hours | 3.85 | +25 | +17 | +14 | +6 | −14 |
| Reference Ex. 2-4: 72 hours | 3.87 | +25 | +17 | +14 | +5 | −14 |
| Reference Ex. 2-5: 96 hours | 3.49 | +23 | +15 | +13 | −3 | −15 |

Figure 2:
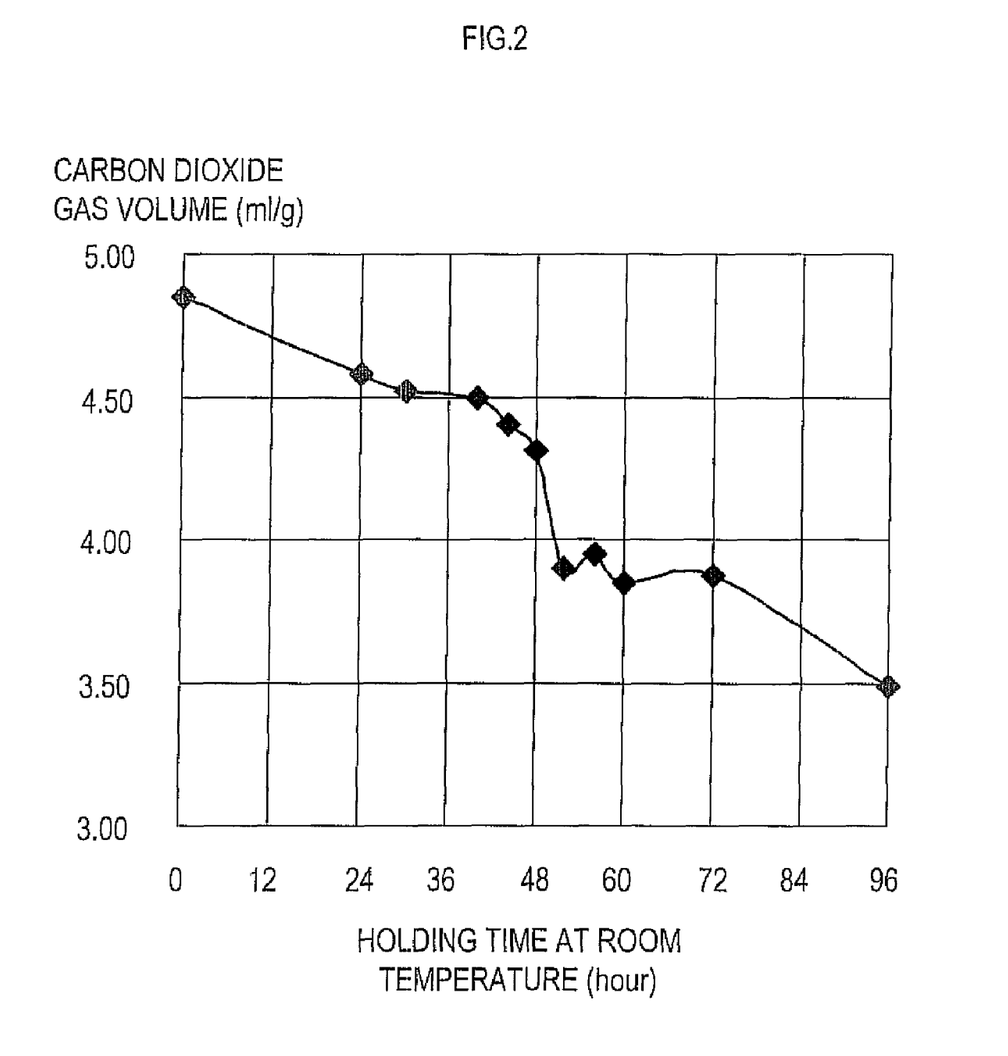
FIG. 2 is a graph showing a relation between holding time and carbon dioxide gas volume when roasted coffee beans are kept at room temperature and stored at −37° C.

FIG. 2 is a graph showing a relation between the holding time and the carbon dioxide gas volume shown in TABLE 2. It was understood from FIG. 2 that there is substantial difference in carbon dioxide gas volume before and after elapse of forty eight hours of holding time even if the holding temperature after roasting is −37° C. Even in the case of −37° C., as seen in TABLE 1, carbon dioxide gas volume in the beans was not largely reduced within forty eight hours of holding time at room temperature after roasting. Change in flavor of the liquid extract was avoided. No substantial difference in flavor was sensed in two hours after extraction. From the above results, it was understood that there is substantial difference in carbon dioxide gas volume before and after forty eight hours of holding time at least at 0° C. or below.

Now, storage temperature and carbon dioxide gas volume was examined when holding time at room temperature is set to forty eight hours.

Embodiment 3

Storage Temperature after Holding at Room Temperature After Roasting and Carbon Dioxide Gas Volume Three kilograms of blend of Brazil Santos No. 2 (25%), Columbia Supremo (35%), Ethiopia Djimmah (25%), and Indonesia WIB (15%) was roasted by a roaster manufactured by Fuji Kouki Co., Ltd. The roasting continued until the L-value (lightness), representing the degree of roast of the beans, measured 22 with a color-difference meter (ND1001DP) manufactured by Nippon Denshoku Industries Co., Ltd. Then, the roasted beans were divided into eight batches, with each batch kept and stored in the following conditions. The room temperature here is 28° C.

The First Batch

Embodiment 3-1

After cooled to room temperature, the batch was kept at room temperature for forty eight hours and immediately sealed in an aluminum pouch to be stored at −30° C. for seven days.

The Second Batch

Embodiment 3-2

After cooled to room temperature, the batch was kept at room temperature for forty eight hours and immediately sealed in an aluminum pouch to be stored at −10° C. for seven days.

The Third Batch

Embodiment 3-3

After cooled to room temperature, the batch was kept at room temperature for forty eight hours and immediately sealed in an aluminum pouch to be stored at −5° C. for seven days.

The Fourth Batch

Embodiment 3-4

After cooled to room temperature, the batch was kept at room temperature for forty eight hours and immediately sealed in an aluminum pouch to be stored at 0° C. for seven days.

The Fifth Batch

Reference Example 3-1

After cooled to room temperature, the batch was kept at room temperature for forty eight hours and immediately sealed in an aluminum pouch to be stored at 40° C. for seven days.

The Sixth Batch

Reference Example 3-2

After cooled to room temperature, the batch was kept at room temperature for forty eight hours and immediately sealed in an aluminum pouch to be stored at 10° C. for seven days.

The Seventh Batch

Reference Example 3-3

After cooled to room temperature, the batch was kept at room temperature for forty eight hours and immediately sealed in an aluminum pouch to be stored at 150° C. for seven days.

The Eighth Batch

Reference Example 3-4

After cooled to room temperature, the batch was kept at room temperature for forty eight hours and immediately sealed in an aluminum pouch to be stored at 28° C. for seven days.

Each batch of the roasted beans was ground and brewed in the same manner as in Embodiment 1. Sensory analysis and measurement of carbon dioxide gas volume were conducted in the same manner as in Embodiment 1. Results obtained are shown in TABLE 3

TABLE 3

| Holding Time at Room Temperature and Storage Temperature | Carbon Dioxide Gas Volume (ml/g) in Roasted Beans | Sensory analysis Elapsed time after extraction | | | |
|---|---|---|---|---|---|
| | | 0 hours | 1 hour | 2 hours | 3 hours |
| Embodiment 3-1: 48 hours, −30° C. | 4.38 | +28 | +18 | +12 | −5 |
| Embodiment 3-2: 48 hours, −10° C. | 4.40 | +25 | +20 | +10 | −8 |
| Embodiment 3-3: 48 hours, −5° C. | 4.35 | +23 | +18 | +11 | −9 |
| Embodiment 3-4: 48 hours, 0° C. | 4.31 | +25 | +19 | +10 | −9 |
| Reference Ex. 3-1: 48 hours, 4° C. | 4.15 | +26 | +15 | +5 | −12 |
| Reference Ex. 3-2: 48 hours, 10° C. | 3.80 | +25 | +13 | +6 | −10 |
| Reference Ex. 3-3: 48 hours, 15° C. | 3.13 | +25 | +10 | +1 | −9 |
| Reference Ex. 3-4: 48 hours, 28° C. | 2.58 | +24 | +9 | −3 | −15 |

Figure 3:
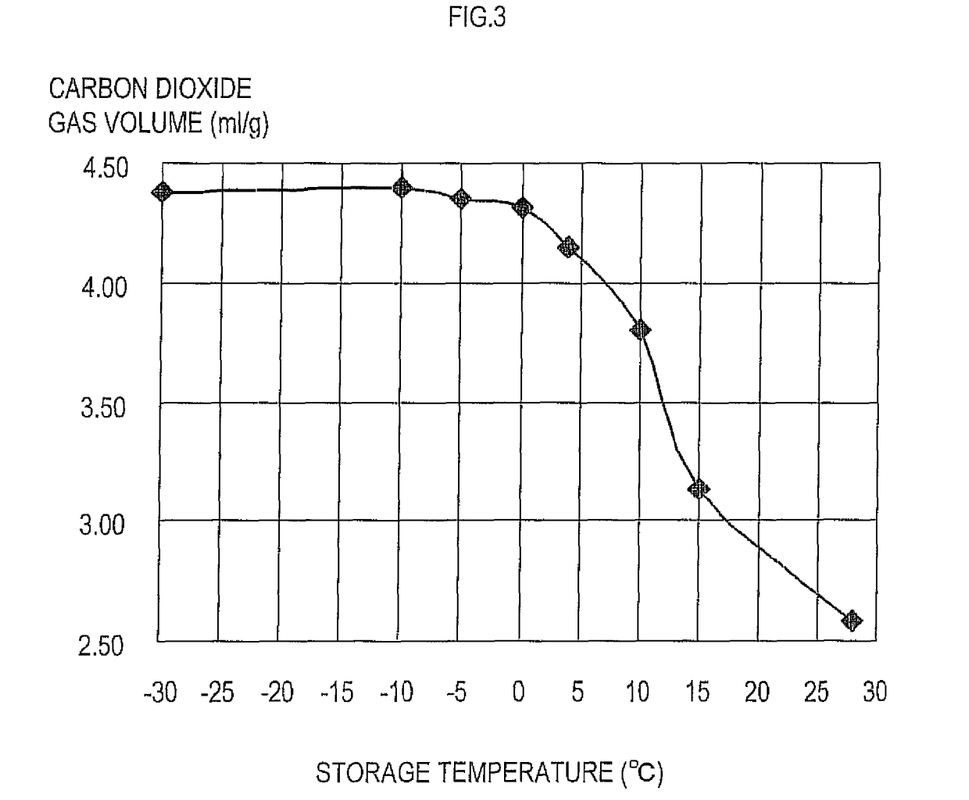
FIG. 3 is a graph showing a relation between storage temperature and carbon dioxide gas volume when roasted coffee beans are kept at room temperature for forty eight hours and stored at various temperatures.

FIG. 3 is a graph showing a relation between the storage temperature and the carbon dioxide gas volume shown in TABLE 3. It was understood from FIG. 3 that there is substantial difference in carbon dioxide gas volume below and above a storage temperature of 0° C. As seen in TABLE 3, in case that holding time at room temperature after roasting is within forty eight hours, change in flavor of the liquid extract can be avoided if storage temperature thereafter is kept at 0° C. or below. No substantial difference in flavor was sensed in two hours after extraction. In the case of the beans stored at 0° C. or below, there was no substantial decrease in carbon dioxide gas volume as compared to that of the beans stored immediately after roasting (Embodiment 1-1). Change was sensed in flavor of the liquid extract of the beans stored at 4° C., in one hour after extraction. There was much change after two hours from extraction. As the storage temperature became higher like 10° C. (Reference Example 3-2), 150° C. (Reference Example 3-3), and 280° C. (Reference Example 3-4), carbon dioxide gas volume in roasted beans became low and change in flavor of the liquid extract became large.

As is clear from the above embodiments, cooling and storing roasted coffee beans to 0° C. or below prior to elapse of forty eight hours, preferably twenty four hours, of holding time at room temperature or below after roasting can suppress emission of carbon dioxide gas from roasted coffee beans in storage. The liquid extract of the roasted coffee beans stored as such has little change in flavor after extraction. Now, examination was conducted concerning effect of holding temperature at room temperature.

Embodiment 4

Effect of Holding Temperature at Room Temperature

Three kilograms of blend of Brazil Santos No. 2 (25%), Columbia Supremo (35%), Ethiopia Djimmah (25%), and Indonesia WIB (15%) was roasted by a roaster manufactured by Fuji Kouki Co., Ltd. The roasting continued until the L-value (lightness), representing the degree of roast of the beans, measured 22 with a color-difference meter (ND1001DP) manufactured by Nippon Denshoku Industries Co., Ltd. Then, the roasted beans were divided into seven batches, with each batch kept and stored in the following conditions. The room temperature here is 28° C.

The First Batch

Reference Example 4-1

After cooled to room temperature, the batch was kept at room temperature at 37° C. for forty eight hours and immediately sealed in an aluminum pouch to be stored at 0° C. for seven days.

The Second Batch

Reference Example 4-2

After cooled to room temperature, the batch was kept at room temperature at 32° C. for forty eight hours and immediately sealed in an aluminum pouch to be stored at 0° C. for seven days.

The Third Batch

Embodiment 4-1

After cooled to room temperature, the batch was kept at room temperature at 28° C. for forty eight hours and immediately sealed in an aluminum pouch to be stored at 0° C. for seven days.

The Fourth Batch

Embodiment 4-2

After cooled to room temperature, the batch was kept at room temperature at 20° C. for forty eight hours and immediately sealed in an aluminum pouch to be stored at 0° C. for seven days.

The Fifth Batch

Embodiment 4-3

After cooled to room temperature, the batch was kept at room temperature at 10° C. for forty eight hours and immediately sealed in an aluminum pouch to be stored at 0° C. for seven days.

The Sixth Batch

Embodiment 4-4

After cooled to room temperature, the batch was kept at room temperature at 40° C. for forty eight hours and immediately sealed in an aluminum pouch to be stored at 0° C. for seven days.

The Seventh Batch

Embodiment 4-5

After cooled to room temperature, the batch was sealed in an aluminum pouch and immediately stored at 0° C. for seven days.

Each batch of the roasted beans was ground and brewed in the same manner as in Embodiment 1. Sensory analysis and measurement of carbon dioxide gas volume were conducted in the same manner as in Embodiment 1. Results obtained are shown in TABLE 4.

TABLE 4

| Holding Temperature before Storage at 0° C. | Carbon Dioxide Gas Volume (ml/g) in Roasted Beans | Sensory analysis Elapsed time after extraction | | | |
|---|---|---|---|---|---|
| | | 0 hours | 1 hour | 2 hours | 3 hours |
| Reference Ex. 4-1: 37° C. for 48 hours | 3.33 | +23 | +19 | −13 | −12 |
| Reference Ex. 4-2: 32° C. for 48 hours | 3.94 | +24 | +18 | −7 | −9 |
| Embodiment 4-1: 28° C. for 48 hours | 4.31 | +25 | +18 | +10 | −11 |
| Embodiment 4-2: 20° C. for 48 hours | 4.36 | +22 | +20 | +11 | −9 |
| Embodiment 4-3: 10° C. for 48 hours | 4.50 | +26 | +18 | +10 | −10 |
| Embodiment 4-4: 4° C. for 48 hours | 4.53 | +23 | +18 | +11 | −7 |
| Embodiment 4-5: stored immediately after coold | 4.60 | +24 | +21 | +12 | −9 |

Figure 4:
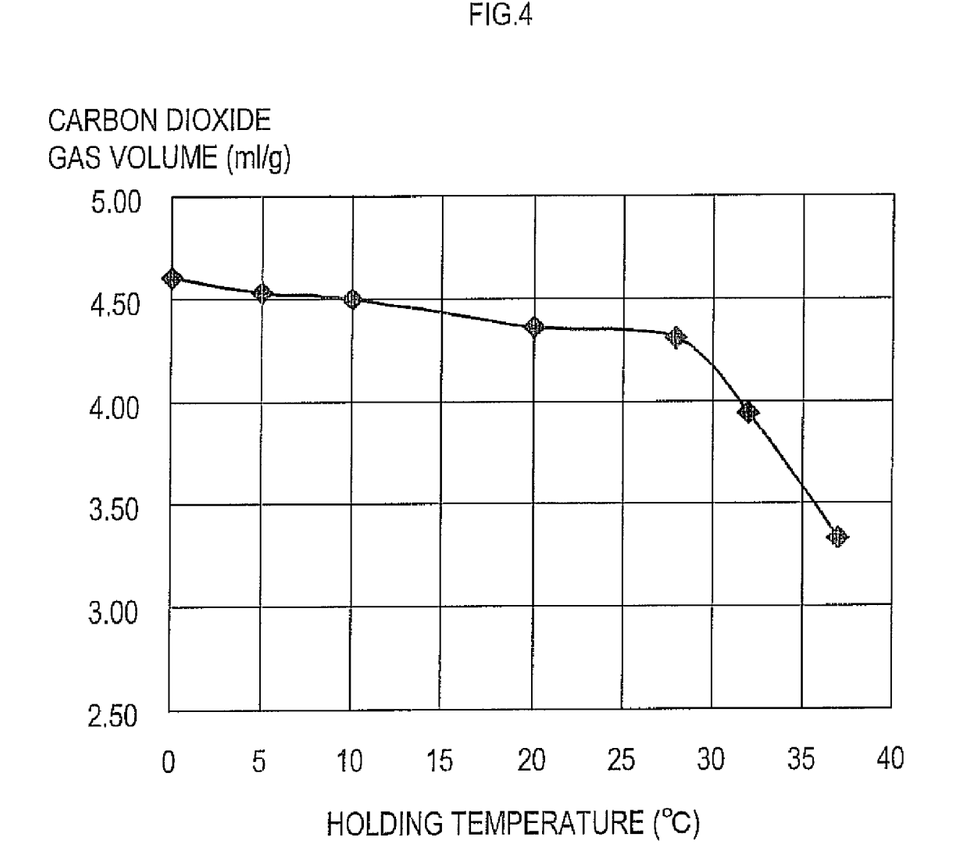
FIG. 4 is a graph showing a relation between holding temperature at room temperature and carbon dioxide gas volume.

FIG. 4 is a graph showing a relation between the holding temperature and the carbon dioxide gas volume shown in TABLE 4. It was understood from FIG. 4 that there is substantial difference in carbon dioxide gas volume below and above a holding temperature of 28° C. As seen in TABLE 4, in case that holding temperature at room temperature after roasting is 28° C. or below, change in flavor of the liquid extract can be avoided if storage temperature thereafter is kept at 0° C. or below. No substantial difference in flavor was sensed in two hours after extraction. In the case of the beans stored at 28° C. or below, there was no substantial decrease in carbon dioxide gas volume as compared to that of the beans stored immediately after roasting (Embodiment 1-1). Change was sensed in flavor of liquid extract of the beans kept at 32° C., in one hour after extraction. There was much change after two hours from extraction. Also, great change was sensed in flavor of liquid extract of the beans kept at 37° C., in two hours after extraction. Carbon dioxide gas volume in the roasted beans was decreased to 77% of that of the beans in Embodiment 4-1.

Embodiment 5

Tests on Other Beans

Three kilograms of Brazil Santos No. 2 was roasted by a roaster manufactured by Fuji Kouki Co., Ltd. The roasting continued until the L-value (lightness), representing the degree of roast of the beans, measured 23 with a color-difference meter (ND1001DP) manufactured by Nippon Denshoku Industries Co., Ltd. Then, the roasted beans were divided into five batches, with each batch kept and stored in the following conditions. The room temperature here is 28° C.

The First Batch

Embodiment 5-1

After cooled to room temperature, the batch was immediately stored at −30° C. for nine days.

The Second Batch

Embodiment 5-2

After cooled to room temperature, the batch was kept at room temperature for forty eight hours and then sealed in an aluminum pouch to be stored at −30° C. for seven days.

The Third Batch

Embodiment 5-3

After cooled to room temperature, the batch was kept at room temperature for forty eight hours and then sealed in an aluminum pouch to be stored at 0° C. for seven days.

The Fourth Batch

Reference Example 5-1

After cooled to room temperature, the batch was kept at room temperature for forty eight hours and then sealed in an aluminum pouch to be stored at 15° C. for seven days.

The Fifth Batch

Reference Example 5-2

After cooled to room temperature, the batch was kept at room temperature for forty eight hours and then sealed in an aluminum pouch to be stored at 28° C. for seven days.

Each batch of the roasted beans was ground and brewed in the same manner as in Embodiment 1. Sensory analysis and measurement of carbon dioxide gas volume were conducted in the same manner as in Embodiment 1. Results obtained are shown in TABLE 5.

TABLE 5

| Holding Time at Room Temperature and Storage Temperature | Carbon Dioxide Gas Volume (ml/g) in Roasted Beans | Sensory analysis Elapsed time after extraction | | | |
|---|---|---|---|---|---|
| | | 0 hours | 1 hour | 2 hours | 3 hours |
| Embodiment 5-1: 0 hours, −30° C. | 3.56 | +23 | +21 | +12 | −8 |
| Embodiment 5-2: 48 hours, −30° C. | 3.42 | +20 | +18 | +16 | −10 |
| Embodiment 5-3: 48 hours, 0° C. | 3.17 | +21 | +16 | +8 | −9 |
| Reference Ex. 5-1: 48 hours, 15° C. | 2.78 | +18 | +6 | −3 | −12 |
| Reference Ex. 5-2: 48 hours, 28° C. | 2.48 | +10 | +4 | −11 | −17 |

As seen in TABLE 5, in the case of Brazil Santos No. 2, carbon dioxide gas volume in the beans were generally low as compared to those in the blended beans of Embodiments 1 to 4. However, change in flavor was avoided if decrease in carbon dioxide gas volume was inhibited after roasting. That is, even though the holding time at room temperature after roasting was within forty eight hours, decrease in carbon dioxide gas volume was inhibited by subsequent storage at 0° C. or below. There was no large decrease in carbon dioxide gas volume as compared to that of the beans stored immediately after roasting (Embodiment 5-1). Also, no great difference in flavor of liquid coffee extract was sensed in two hours after extraction. As to liquid coffee extract of the beans stored at 15° C., substantial change in flavor was sensed in one hour after extraction. The flavor was further changed after two hours from extraction. Carbon dioxide gas volume in the roasted beans was decreased to 78% of that of the beans in Embodiment 5-1.

As is clear from the above embodiments, cooling and storing roasted coffee beans to 0° C. or below prior to elapse of forty eight hours, preferably twenty four hours, of holding time at room temperature or below after roasting can suppress emission of carbon dioxide gas from the roasted coffee beans in storage. The liquid extract of the roasted coffee beans stored as such has little change in flavor after extraction.

The present invention is not limited by the above described embodiments and can be practiced in various manners without departing from the scope of the present invention. For instance, packing the roasted coffee beans cooled to 0° C. or below prior to elapse of forty eight hours, preferably twenty four hours, of holding time at room temperature or below after roasting into an airtight container in the presence of carbon dioxide gas can further suppress emission of carbon dioxide gas from the roasted coffee beans in storage. The liquid extract of the roasted coffee beans stored as such has little change in flavor after extraction.

Now, experimental results are described on effect of packing the roasted coffee beans into an airtight container in the presence of carbon dioxide gas.

Experimental Example 1

Effect of Filling Carbon Dioxide Gas

Three kilograms of blend of Brazil Santos No. 2 (25%), Columbia Supremo (35%), Ethiopia Djimmah (25%), and Indonesia WIB (15%) was roasted by a roaster manufactured by Fuji Kouki Co., Ltd. The roasting continued until the L-value (lightness), representing the degree of roast of the beans, measured 22 with a color-difference meter (ND1001DP) manufactured by Nippon Denshoku Industries Co., Ltd. Then, the roasted beans were divided into seven batches, with each batch kept and stored in the following conditions. The room temperature here is 28° C.

The First Batch

Experimental Example 1-1

After cooled and kept for forty eight hours at room temperature, the batch was immediately sealed in an aluminum pouch made of aluminum foil, polyethylene and polyethylene terephthalate (hereinafter, referred to just as aluminum pouch) with carbon dioxide gas and stored at −30° C. for seven days.

The Second Batch

Experimental Example 1-2

After cooled and kept for forty eight hours at room temperature, the batch was immediately sealed in an aluminum pouch with carbon dioxide gas and stored at 4° C. for seven days.

The Third Batch

Experimental Example 1-3

After cooled and kept for forty eight hours at room temperature, the batch was immediately sealed in an aluminum pouch with carbon dioxide gas and stored at 15° C. for seven days.

The Fourth Batch

Experimental Example 1-4

After cooled and kept for forty eight hours at room temperature, the batch was immediately sealed in an aluminum pouch with carbon dioxide gas and stored at 28° C. for seven days.

The Fifth Batch

Experimental Example 1-5

After cooled and kept for forty eight hours at room temperature, the batch was immediately sealed in an aluminum pouch in the atmosphere and stored at −30° C. for seven days.

The Sixth Batch

Experimental Example 1-6

After cooled and kept for forty eight hours at room temperature, the batch was immediately sealed in an aluminum pouch in the atmosphere and stored at 4° C. for seven days.

The Seventh Batch

Experimental Example 1-7

After cooled and kept for forty eight hours at room temperature, the batch was immediately sealed in an aluminum pouch in the atmosphere and stored at 28° C. for seven days.

Each batch of the roasted beans was ground and brewed in the same manner as in Embodiment 1. Sensory analysis and measurement of carbon dioxide gas volume were conducted in the same manner as in Embodiment 1. TABLE 6 shows results obtained.

TABLE 6

| Presence/Absence of CO$_2$ and Storage Temperature | Carbon Dioxide Gas Volume (ml/g) in Roasted Beans | Sensory analysis Elapsed time after extraction | | | |
|---|---|---|---|---|---|
| | | 0 hours | 1 hour | 2 hours | 3 hours |
| Experimental Ex. 1-1: CO$_2$ present, −30° C. | 4.85 | +25 | +20 | +16 | −5 |
| Experimental Ex. 1-2: CO$_2$ present, 4° C. | 4.76 | +21 | +16 | +12 | −10 |

TABLE 6-continued

| Presence/Absence of CO$_2$ and Storage Temperature | Carbon Dioxide Gas Volume (ml/g) in Roasted Beans | Sensory analysis Elapsed time after extraction | | | |
|---|---|---|---|---|---|
| | | 0 hours | 1 hour | 2 hours | 3 hours |
| Experimental Ex. 1-3: CO$_2$ present, 15° C. | 4.64 | +26 | +21 | +18 | −3 |
| Experimental Ex. 1-4: CO$_2$ present, 28° C. | 4.57 | +24 | +18 | +16 | −5 |
| Experimental Ex. 1-5: CO$_2$ absent, −30° C. | 4.38 | +26 | +18 | +12 | −7 |
| Experimental Ex. 1-6: CO$_2$ absent, 4° C. | 4.15 | +25 | +17 | +3 | −10 |
| Experimental Ex. 1-7: CO$_2$ absent, 28° C. | 2.58 | +25 | +9 | −2 | −12 |

As to the roasted coffee beans which were packed in the presence of carbon dioxide gas and stored at room temperature (28° C.) or below, there was no substantial decrease in carbon dioxide gas volume, and the grades in the sensory analysis were high. There was little change in flavor in two hours after extraction. Especially, the beans stored at −30° C. had high carbon dioxide gas volume. As to the beans stored at −30° C., there was no substantial decrease in carbon dioxide gas volume in the case of Experimental Example 1-5 in which the beans were stored at −30° C. However, in the case of Experimental Examples 1-6 and 1-7 in which the beans were stored above a temperature of 0° C., decrease in carbon dioxide gas volume was seen. There was also substantial change in flavor in two hours after extraction.

It was understood from the results in TABLE 6 that, if coffee beans are kept at room temperature after roasting, packed into an airtight container filled with carbon dioxide gas, and stored at room temperature or below, it is possible to favorably suppress emission of carbon dioxide gas from the roasted coffee beans in storage. Accordingly, by combining airtight storage in the presence of carbon dioxide gas and the aforementioned embodiments, emission of carbon dioxide gas from the roasted coffee beans can be inhibited and long term storage can be achieved.

What is claimed is:

1. A method of storing roasted whole coffee beans so as to maintain flavor of a liquid coffee extract from the coffee beans for at least two hours following extraction, the method comprising the steps of:
    cooling the whole roasted coffee beans to a temperature between 10° C. and 28° C. after roasting;
    holding the roasted and cooled whole coffee beans, prior to packaging, at the temperature between 10° C. and 28° C. for a holding time of forty eight hours; then
    packaging the whole coffee beans into packaging for sale to consumers; and
    storing the packaged whole coffee beans, which are held at the temperature between 10° C. and 28° C. for the holding time prior to packaging, at a temperature of between −10° C. and 0° C.

2. The method according to claim 1, further comprising the step of grinding the whole coffee beans prior to extraction.

3. The method according to claim 1, further comprising the step of prior to storing the roasted and cooled coffee beans at a temperature of between −10° C. and 0 C, packaging the roasted and cooled coffee beans in an airtight container in a presence of carbon dioxide, to suppress emission of carbon dioxide from the roasted and cooled coffee beans.

4. The method according to claim 1, further comprising the step of storing the roasted and cooled coffee beans immediately after packaging.

5. A method of roasting and storing roasted whole coffee beans so as to maintain flavor of a liquid coffee extract from the coffee beans for at least two hours following extraction, the method comprising the steps of:
    roasting the whole coffee beans;
    cooling the roasted whole coffee beans, following roasting, to a temperature between 10° C. and 28° C.;
    maintaining the roasted and cooled whole coffee beans, prior to packaging, at the temperature between 10° C. and 28° C. for a holding time between twenty four and forty eight hours;
    packaging the whole coffee beans into packaging for sale to consumers;
    storing the packaged whole coffee beans, which are maintained for the holding time prior to packaging, at a temperature of between −10° C. and 0° C.

6. The method according to claim 5, further comprising the step of prior to storing the roasted and cooled coffee beans at a temperature of between −10° C. and 0 C, packaging the roasted and cooled coffee beans in an airtight container in a presence of carbon dioxide, to suppress emission of carbon dioxide from the roasted and cooled coffee beans.

7. The method according to claim 5, further comprising the step of storing the roasted and cooled coffee beans within forty eight hours after roasting.

8. The method according to claim 5, further comprising the step of grinding the whole coffee beans prior to extraction.

* * * * *